(12) United States Patent
Richardson et al.

(10) Patent No.: US 9,914,403 B1
(45) Date of Patent: Mar. 13, 2018

(54) BRACKET FOR FREESTAND MOUNTING AN OPTICAL WARNING DEVICE TO SIDE OF A TRUCK BED

(71) Applicant: STAR HEADLIGHT & LANTERN CO., INC., Avon, NY (US)

(72) Inventors: J. Douglas Richardson, Pittsford, NY (US); Michael A. Barbato, Webster, NY (US)

(73) Assignee: STAR HEADLIGHT & LATERN CO., INC., Avon, NY (US)

( * ) Notice: Subject to any disclaimer, the term of this patent is extended or adjusted under 35 U.S.C. 154(b) by 0 days.

(21) Appl. No.: 14/874,452

(22) Filed: Oct. 4, 2015

(51) Int. Cl.
  *B60P 7/06* (2006.01)
  *B60R 11/00* (2006.01)
  *B60Q 1/52* (2006.01)

(52) U.S. Cl.
  CPC ............... *B60R 11/00* (2013.01); *B60Q 1/52* (2013.01); *B60R 2011/004* (2013.01); *B60R 2011/0059* (2013.01)

(58) Field of Classification Search
  CPC ..... B60J 7/102; B60J 7/141; Y10T 29/49826; B23P 11/00; B60P 3/40; B60P 7/04; B60P 7/0807; B60P 7/0815; B60R 13/01; B62D 33/0207
  USPC .......................................................... 296/43
  See application file for complete search history.

(56) References Cited

U.S. PATENT DOCUMENTS

| | | | | | |
|---|---|---|---|---|---|
| 2,570,802 | A | * | 10/1951 | Hatteburg | B60R 9/00 224/310 |
| 3,149,878 | A | * | 9/1964 | Heermann | B60P 3/32 296/102 |
| 3,765,713 | A | * | 10/1973 | Suitt | B60R 9/00 224/309 |
| 4,057,281 | A | * | 11/1977 | Garrett | B60P 3/40 224/42.32 |
| 4,138,046 | A | * | 2/1979 | De Freze | B60R 9/00 211/182 |
| 4,267,948 | A | * | 5/1981 | Lewis | B60R 9/00 211/191 |

(Continued)

OTHER PUBLICATIONS

Backrack, Inc., Installing Backrack Cab Guards on 2004-1012 Ford F-150 5.5 ft Bed, http://backrack.ca/img/site/Guides/5.5-ft-Install-Presentation.pdf, printed Sep. 1, 2015.

(Continued)

*Primary Examiner* — Kiran B Patel
(74) *Attorney, Agent, or Firm* — Kenneth J. Lukacher; Lukacher Law Group

(57) ABSTRACT

A bracket is provided having a shaft with an upper end for mounting an optical warning device and a platform supporting a lower end of the shaft. The platform is fixed to a side of a truck bed so that the upper end of the shaft extends from the shaft to position the optical warning device at a height higher than the cab of the truck. The bracket freestands mounts the optical warning device since the optical warning device stands alone or on its own foundation provided by the attachment of platform to side of the truck bed, free of support or attachment to any other part of the truck. The platform may be attached by a support member mounted in a stake pocket present along the side of the bed of the truck, or by one or more clamp members to the side of the truck bed.

28 Claims, 10 Drawing Sheets

(56) References Cited

U.S. PATENT DOCUMENTS

| | | | |
|---|---|---|---|
| 4,378,127 A * | 3/1983 | Rossi, Sr. | B62D 33/08 224/309 |
| 4,381,123 A * | 4/1983 | Anderson | B60P 7/0815 296/43 |
| 4,405,170 A * | 9/1983 | Raya | B60P 3/42 224/309 |
| 4,423,899 A * | 1/1984 | Langmead | B60R 9/00 211/182 |
| 4,509,787 A | 4/1985 | Knaack et al. | |
| 4,659,131 A * | 4/1987 | Flournoy, Jr. | B60R 9/00 296/3 |
| 4,676,543 A * | 6/1987 | Lewis | B60R 9/00 296/3 |
| 4,770,458 A * | 9/1988 | Burke | B62D 33/0222 224/405 |
| 4,867,497 A * | 9/1989 | Jayne | B60R 9/00 224/405 |
| 4,953,908 A * | 9/1990 | Dondlinger | B60J 1/2088 280/762 |
| 4,989,768 A * | 2/1991 | McNulty | B60R 9/02 224/405 |
| 5,002,324 A * | 3/1991 | Griffin | B60R 9/00 224/405 |
| 5,190,337 A * | 3/1993 | McDaniel | B60R 9/00 224/405 |
| 5,192,107 A * | 3/1993 | Smith, Sr. | B60P 3/40 296/3 |
| 5,238,280 A * | 8/1993 | Christensen | B60R 9/00 296/3 |
| 5,257,728 A * | 11/1993 | Gibson | B60R 9/08 224/321 |
| 5,299,849 A | 4/1994 | Cook et al. | |
| 5,494,327 A * | 2/1996 | Derecktor | B60P 3/40 224/321 |
| 5,560,666 A * | 10/1996 | Vieira | B60R 9/00 224/402 |
| 5,628,540 A * | 5/1997 | James | B60R 9/00 211/189 |
| 5,692,791 A * | 12/1997 | Sulzer | B60J 7/102 224/403 |
| 5,743,583 A * | 4/1998 | Lowe | B60P 3/00 211/195 |
| 5,806,905 A * | 9/1998 | Moore | B60R 9/00 296/3 |
| 5,836,635 A * | 11/1998 | Dorman | B60R 9/00 224/405 |
| D436,915 S | 1/2001 | Burger | |
| D444,446 S | 7/2001 | Carter | |
| 6,340,106 B1 | 1/2002 | Dutton | |
| 6,347,731 B1 * | 2/2002 | Burger | B60R 9/00 224/402 |
| 6,513,849 B2 | 2/2003 | Carter | |
| 6,517,134 B2 * | 2/2003 | Armstrong | B60P 3/40 224/405 |
| 6,557,917 B1 * | 5/2003 | Colcombe | B60R 9/00 224/403 |
| D494,532 S | 8/2004 | Reese | |
| 7,030,822 B1 * | 4/2006 | Grabowski | H01Q 1/1207 248/539 |
| 7,104,429 B1 * | 9/2006 | Flores | B60R 9/00 211/207 |
| 7,419,075 B2 | 9/2008 | Green | |
| 7,464,977 B1 * | 12/2008 | Price | B60P 3/40 296/26.05 |
| 7,494,169 B2 * | 2/2009 | Collins | B60P 3/40 296/3 |
| 8,591,156 B2 | 11/2013 | Grone | |
| 9,159,254 B2 | 10/2015 | Young | |
| 2004/0262348 A1 * | 12/2004 | Green | B60R 9/00 224/405 |
| 2009/0133616 A1 * | 5/2009 | Karnes | B62D 33/0207 116/173 |
| 2011/0108590 A1 * | 5/2011 | Kennedy | B60R 9/045 224/402 |
| 2012/0318189 A1 | 12/2012 | Dyoung | |
| 2014/0014698 A1 | 1/2014 | Schellens | |
| 2015/0294605 A1 * | 10/2015 | Conway | G09F 17/00 116/173 |

OTHER PUBLICATIONS

Acari Products, Acari Drill Free, http://acariproducts.com, printed Sep. 20, 2015.

Amazon.com: truck stake pocket anchors: Automotive, printed Sep. 1, 2015.

Walcott Radio, Inc., Firestik SS294A Stake Pocket Pickup Truck CB Antenna Mount, http://www.walcottradio.com/firestik-ss294a-stake-pocket-pickup-truck-cb-antenna-mount-p-2466.html, printed Sep. 1, 2015.

FTL CB Radios, Firestik MK294R Pickup Truck Stake Pocket CB Antenna Mount Kit, https://www.ftldist.com/firestik-pickup-truck-stake-pocket-cb-antenna-mount-kit.html, printed Sep. 1, 2015.

Electronic Controls Company, SAE Class I, Pole Mount, Amber, http://www.eccolink.com/products/productdetails.aspx?id=12375&catid=2487&menuId=, printed Sep. 20, 2015.

CargoGear.com, TracRac aluminum sliding truck rack—Old Version, http://www.cargogear.com/infolib.aspx?lookup=trsystem&image=tracracbjpg, printed Sep. 1, 2015.

Backrack, Inc., Truck Racks, http://backrack.com/truck-racks/all-racks.html, printed Sep. 1, 2015.

Backrack, Inc., Truck Racks, Backrack Accessories, http://backrack.com/accessories.aspx, printed Sep. 1, 2015.

Premier Hazard Ltd., Motorcycle Mast Kit, http://premierhazard.co.uk/products/105/motorcycle-mast-kit, printed Sep. 20, 2015.

YahooShopping.com, Redneck Trailer Stake Pocket D-Ring, https://shopping.yahoo.com/1682950917-stake-pocket-d-ring/?bfr=50.0, printed Sep. 20, 2015.

\* cited by examiner

BRACKET FOR FREESTAND MOUNTING AN OPTICAL WARNING DEVICE TO SIDE OF A TRUCK BED

FIELD OF THE INVENTION

The present invention relates to a bracket (and system and method using same) for freestand mounting an optical warning device, such as a lamp, beacon, light bar, or other unit for projecting optical warning signals, from the side of a truck bed, and particularly to a bracket for freestand mounting an optical warning device from the side of a typical truck bed of a pickup truck which avoids the need for drilling holes in the truck for mounting such bracket.

BACKGROUND OF THE INVENTION

A pickup truck is a light duty truck having an enclosed cab and an open cargo area, called a truck bed, with low sides and a tailgate. Often the sides of the truck bed have square or rectangular upper openings spaced along their length. Each of the upper openings extend to a hollow cavity between the inner and outer walls that form the side of the truck bed, and have an opening along the inner wall of the side of the truck bed to access the cavity. These upper openings along the side of the truck bed are commonly called stake pockets. Different models of pickup trucks can have different shaped stake pockets.

Stake pockets have been used for a variety of applications since it avoids the need for drilling holes along the side of the truck bed for mounting items. When not capped or otherwise covered, one common usage of stake pockets is to hold anchor inserts having rings for attaching hooks of tie down straps. Other usages for stake pockets are for supporting CB antennas, support structures for tool boxes, or for holding racks across the bed of a pickup truck. For example, two or three rack structures can be supported by different pairs of stake pockets along opposite sides of a truck bed to horizontally support items raised above the truck bed, such as a canoe or lumber. Another example is the Backrack® sold by Backrack, Inc. of Oakville, Ontario, Canada, having a vertical rack that extends across the back of the truck bed and upwards along the truck rear window. Such vertical rack is supported by stake pockets along opposite sides of the truck bed, and can be used to hold tools upright along the back of the cab, or for mounting warning lights, such as a beacon or light bar.

Although exterior warning lights, such as a beacon or light bar, may be mounted to the roof of a pickup truck cab, it can require drilling holes for mounting bracket supports and/or electrical wiring to the warning lights. This often is undesirable in cases where such warning lights need only be temporarily installed upon the truck when used in a particular environment requiring warning lights, such as at a construction site or for traffic control, but not at other times. Moreover, a pickup truck owner typically wishes to avoid damage due to drilled holes or any possible surface damage to his or her personal truck that can be caused by mounting exterior warning lights to the cab roof or to any other exterior part of the truck body. While use of stake pockets for supporting a vertical rack across a truck bed, as described above, may be useful to avoid such damage to a pickup truck cab roof by mounting warning lights along the top of the vertical rack, such vertical racks are bulky and expensive, and need to be fitted to the particular truck model due to different truck body sizes and shapes. Further, warning lights may be mounted to the cab roof using a magnetic mounting assembly, but such mounting is generally limited for stationary or slow moving trucks and is not suitable for some newer trucks made with aluminum materials.

Thus, it would be desirable to mount exterior warning lights to a pickup truck that can be universally mounted to different truck models without possible damage to the truck cab roof or to any other exterior part of the truck body.

SUMMARY OF THE INVENTION

Accordingly, it is an object of the present invention to provide a bracket for mounting warning lights to the side of the bed of a pickup truck that can be universally mounted to different truck models and avoids risk of damage to the roof to the truck's cab or to any other exterior part of the truck body.

It is another object of the present invention to provide a bracket for mounting an optical warning device to the side of the bed of a pickup truck so that the optical warning device freestands from the side of the bed of the truck bed upon such bracket.

It is a further object of the present invention to provide a bracket for mounting warning lights to the side of the bed of a pickup truck that can be attached to the truck using a stake pocket when present along such side of the truck bed, and also when such stake pocket is not present.

A still another object of the present invention is to provide a bracket for mounting warning lights to the side of the bed of a pickup truck that positions the warning lights atop of the bracket preferably higher than the height of the cab of the truck.

A further object of the present invention is to provide a bracket for mounting warning lights to the side of the bed of a pickup truck that can position the warning lights near the back upper corner of the truck cab at a height above the height of the cab of the truck.

Briefly described, the bracket of the present invention has a shaft having an upper end for mounting an optical warning device, and a platform supporting a lower end of the shaft. The platform is fixed to a side of a bed of a truck so that the upper end of the shaft extends from the shaft to position the optical warning device at a height higher than the cab of the truck.

The bracket freestand mounts the optical warning device, since the optical warning device stands alone or on its own foundation provided by attachment to the platform to the side of the truck bed, free of support or attachment to any other part of the truck. Being at a position higher than the truck cab, the optical warning device can project optical warning signals circumferentially around the truck viewable from a front, back, right side, and left side of the truck. Preferably, at least a portion of the shaft bends inwardly as it extends upward from the platform to position the upper end of shaft near the back top (or upper corner) of the cab, mimicking the outer shape or side profile of the cab.

When the side of the truck bed has stake pockets, a support member is inserted into one of stake pockets, preferably the stake pocket closest to the truck cab, and attached to the platform to retain the platform in a fix position to the side of the truck bed. The support member may additionally be fixed in position by retaining a fastener member extending from the support member via an opening to the stake pocket along the inner wall of the side of the truck bed. When the side of the truck bed has a top wall without a stake pocket, one or more clamping members may be used for clamping the platform in a fixed position to such top wall, preferably close to the truck cab. One or more brackets can be mounted along opposite sides of the truck bed each to freestand mount atop thereof an optical warning device.

The present invention further embodies a system having an optical warning device, and a bracket having an upper end mounted to the optical warning device, and a lower end coupled to a side of a bed of a truck. The bracket freestand mounts the optical warning device from the side of the bed of the truck.

Preferably in such system, the bracket has a single shaft which extends from a base mounted to the side of a bed of a truck. At least a portion of the shaft may bend inwardly as it extends upwards from the base to position the upper end of the bracket near the back top of the cab. The base may represent a platform that is either fixed to a support member which is received and connected to a stake pocket present along the side of the bed of the truck, or fixed by one or more clamp members to the side of the bed of a truck.

The present invention still further embodies a method having the steps of providing a bracket having an upper end supporting an optical warning device, and a platform at a lower end of the bracket, and mounting the platform to the side of the bed of the truck so that the optical warning device freestands from the side of the bed of the truck upon such bracket.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE INVENTION

Figure 1:
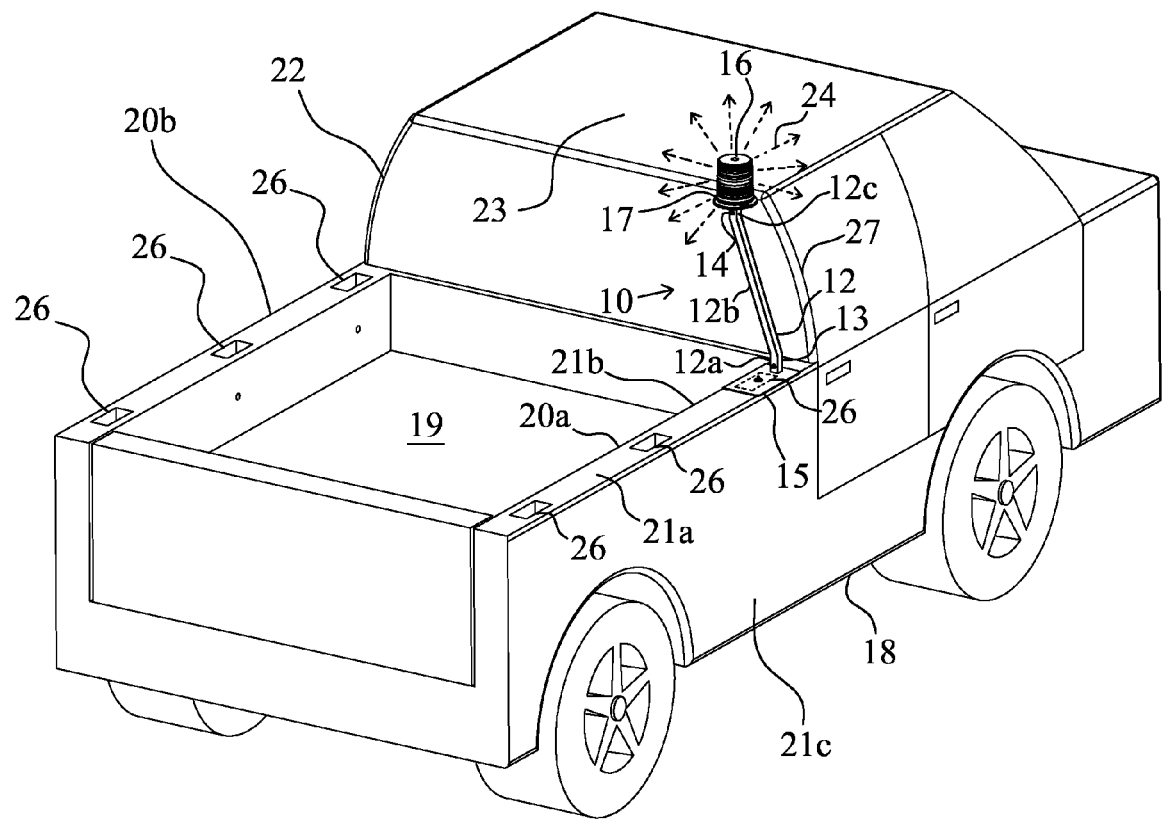
FIG. 1 is a perspective view of the rear of a pickup truck showing the bracket of the present invention having a platform mounted to a stake pocket along one of the sides of the truck bed.
Figure 2:
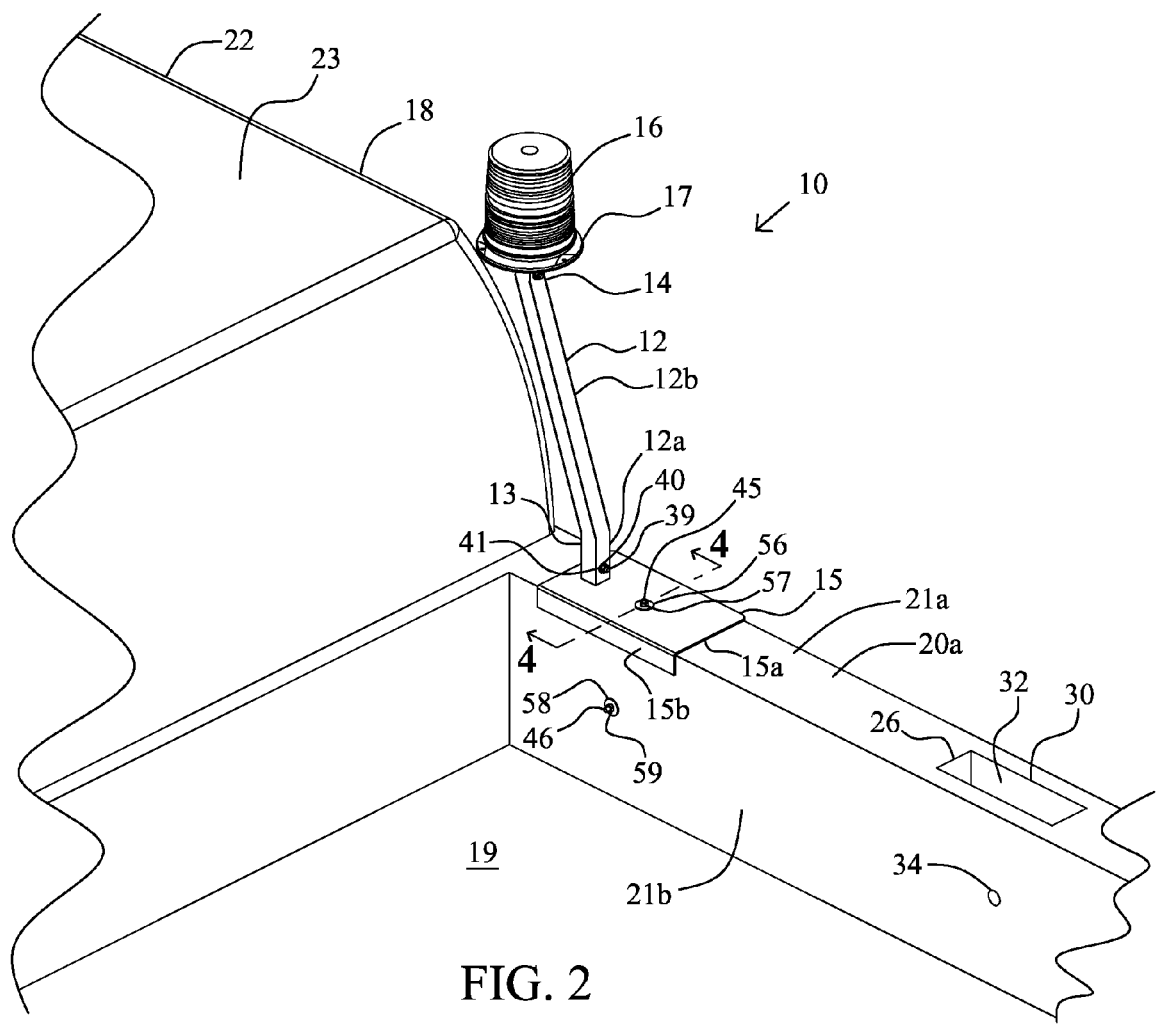
FIG. 2 is another perspective view showing the bracket of FIG. 1 taken from the inside of the truck bed.

Referring more particularly to the drawings, FIGS. 1 and 2 show a bracket 10 having a single shaft 12 with a lower end 13 and an upper end 14, and a platform (or base) 15 from which the lower end 13 extends. The platform 15 is disposed upon the side 20a of a rear bed 19 of a truck 18. The upper end 14 of shaft 12 is fixed to a base 17 of an optical warning device 16. The upper end 14 is at a height so that optical warning device 16 mounted thereto extends higher than the roof 23 of the cab 22 of truck 18. In this manner optical warning signals depicted as light rays 24 (dashed lines) can extend circumferentially around the truck 18 and thus viewable from the front, back, right side, and left side of the truck. The shaft 12 and platform 15 may each be of metal, such as steel, or molded rigid plastic.

Optical warning device 16 represents any type of warning lamp that provides flashing (or strobe) or rotating light pattern of one or more colors. For purposes of example, optical warning device 16 is shown as the Halo® LED beacon manufactured by Star Headlight & Lantern Co., Inc. of Avon N.Y., but other optical warning device may be mounted, including but not limited to, a revolving beacon or a light bar (such as one of the Mini-bar models manufactured by Star Headlight & Lantern Co., Inc.).

Truck 18 of FIGS. 1 and 2 shows an example of stake pockets 26 as described earlier, where three stake pockets 26 are provided along the right side 20a and three stake pockets 26 are provided along the left side 20b of truck bed 19. One of stake pockets 26 covered by platform 15 in FIG. 1 is depicted by dashed lines. As different models of pickup trucks can have different stake pockets, depiction of the stake pockets in FIGS. 1, 2, and 4-6 should not limit the scope of the invention, as the bracket 10 can be universally used with different sizes of stake pockets for different models of trucks.

Figure 3:
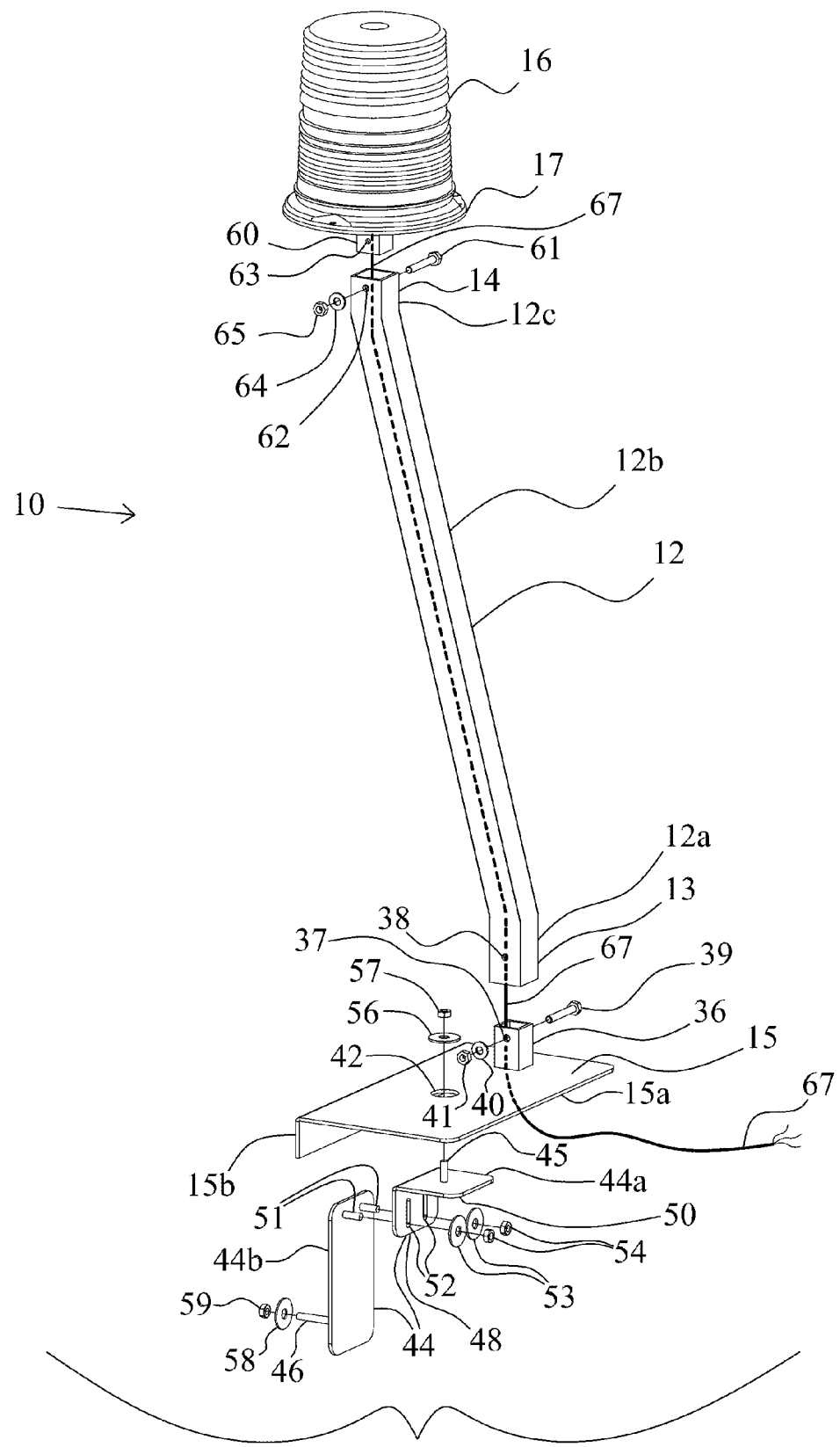
FIG. 3 is an exploded perspective view of the assembly of the components for stake pocket mounting of the bracket of FIGS. 1 and 2 to a truck in which the truck is removed.
Figure 4:
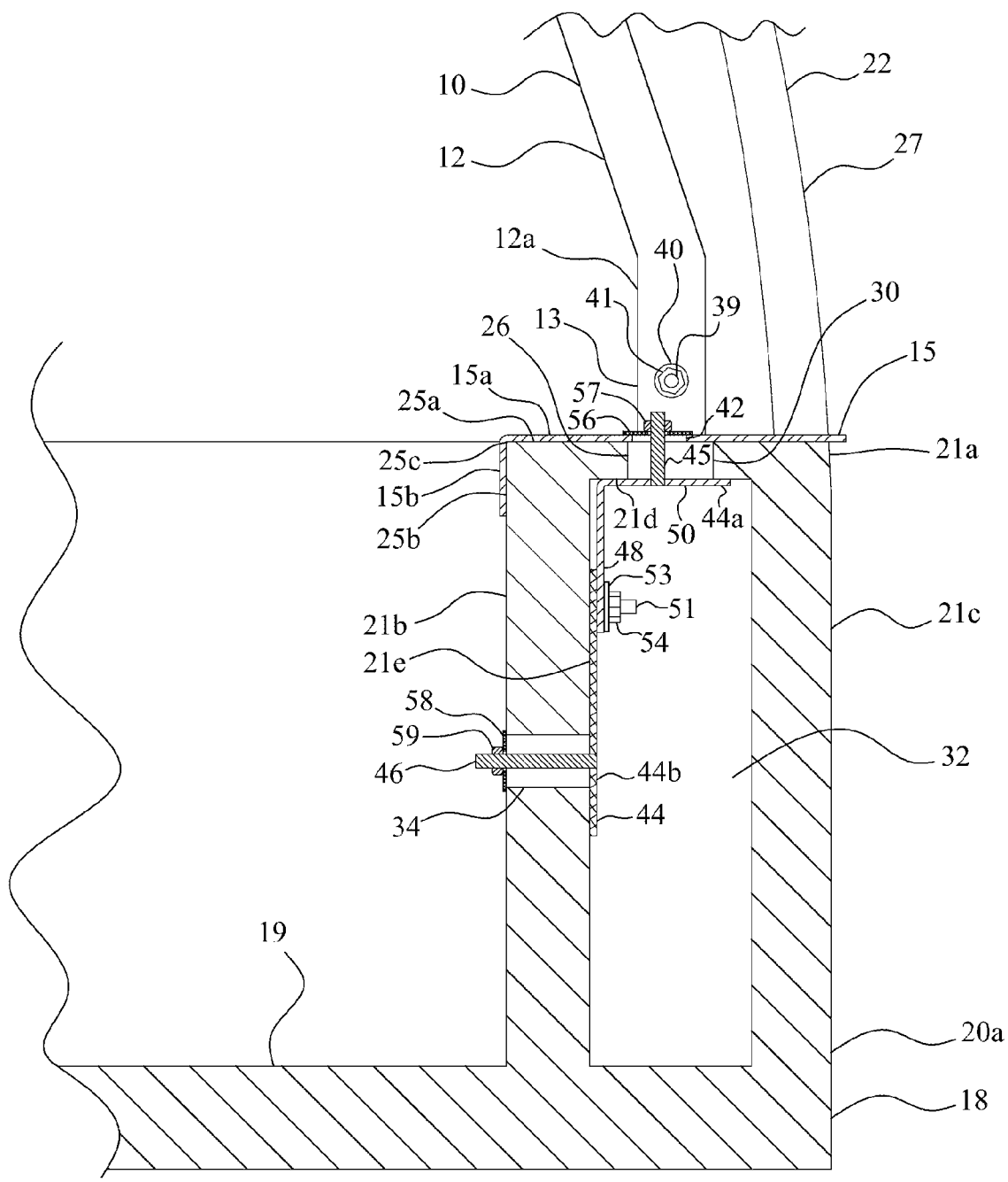
FIG. 4 is a cross-sectional view along lines 4-4 of FIG. 2 showing the lower part of the bracket and its mounting to the stake pocket using a platform, and a support member in the stake pocket.
Figure 5:
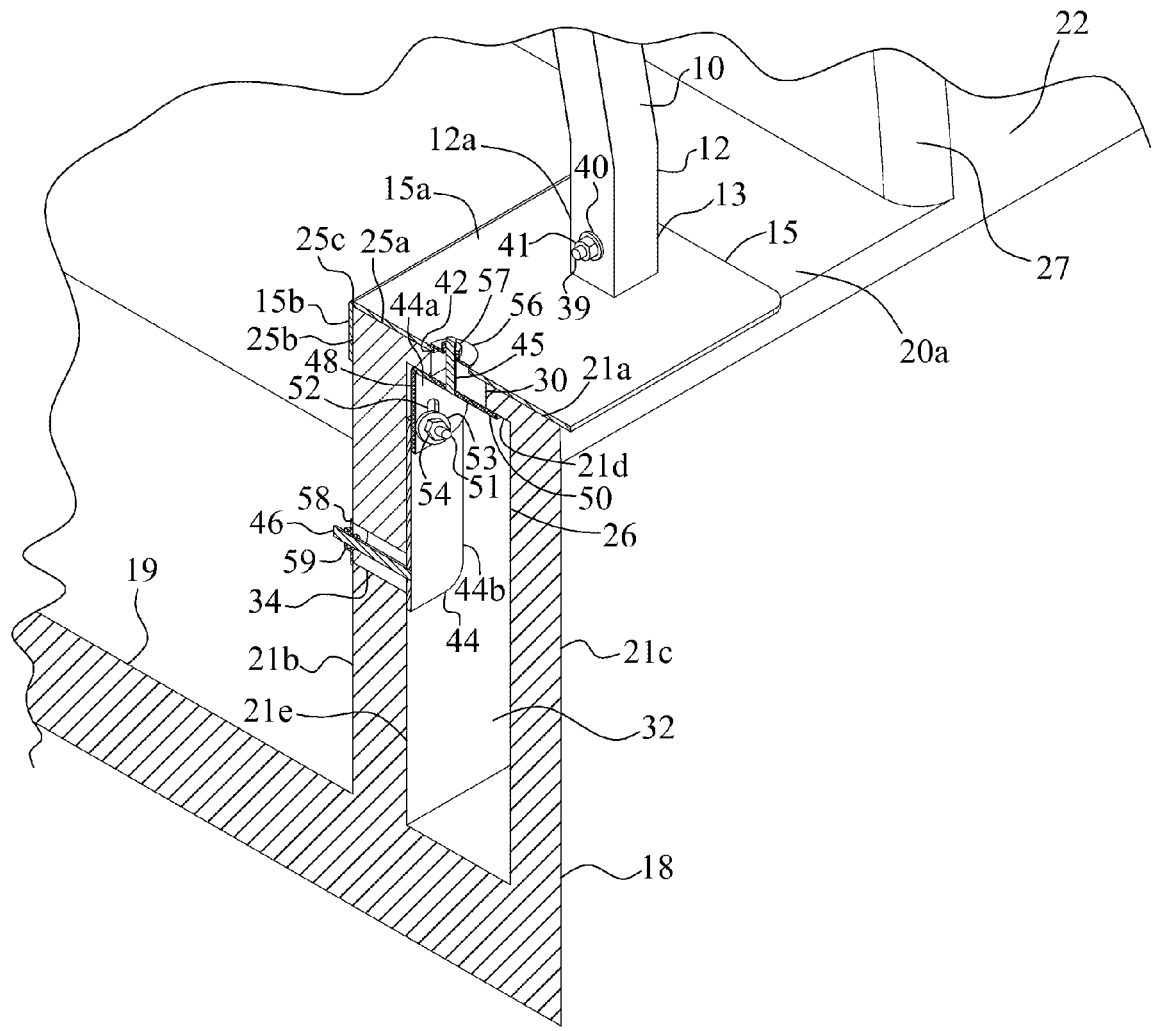
FIG. 5 is a perspective view of the cross-sectional view of FIG. 4.

Referring to FIGS. 3, 4, and 5, the assembly of bracket 10 is shown. As best shown in FIGS. 4 and 5, the top wall 21a of side 20a of truck bed 19 has an opening (or slot) 30 that extends to a hollow cavity 32 between the inner wall 21b and outer wall 21c that forms side 20a with top wall 21a. Another opening (or hole) 34, smaller than opening 30, extends though inner wall 21b into cavity 32. Such opening 30, cavity 32, and opening 34 are representative of common parts of stake pockets 26 which may be utilized herein. Typically walls 21a, 21b, and 21c are of metal, such as steel or aluminum. Shaft 12 may have a square cross-sectional shape as shown in the figures, but can have other cross-sectional shape, such a round. Into lower end 13 of shaft 12 is received upright extension member (or shaft) 36. Extension member 36 is welded to platform 15, or otherwise integrated with the platform when formed, and is shaped to fit along the interior of lower end 13 of shaft 12. When lower end 13 of shaft 12 is located upon extension member 36, as shown in FIGS. 4 and 5, a threaded bolt 39 is received through holes 37 extending through extension member 36 and holes 38 extending through lower end 13 of shaft 12, and then retained via washer 40 by a retainer member of a nut 41. In this manner shaft 12 is fixed to platform 15.

Prior to placement of platform 15 upon side 20a, a support member 44 is received via opening 30 in cavity 32 of stake pocket 26. Support member 44 has an upper fastening member 45 extending though opening 30 of stake pocket 26, and a lower fastening member 46 extending through opening 34 of stake pocket 26. Support member 44 is composed of two bracket members 44a and 44b which are fixed to an adjusted position with respect to each other so that fastening members 45 and 46 are properly positioned to extend through openings 30 and 34 in walls 21a and 21b, respectively. Bracket member 44a is an "L" shaped plate having a first portion 48 with two vertical slots 52 and a second portion 50 from which upper fastening member 45 extends, where portions 48 and 50 are perpendicular to each other. Bracket member 44b is a plate having two fastening members 51 that extend through two slots 52, where each fastening member 51 is retained in their respective slot, via a washer 53, by a retainer member of a nut 54. Fastening members 51 can slide along slots 52 until retained by their respective nut 54 at a position fixing bracket members 44a and 44b stationary with respect to each other, so that support member 44 is positioned with fastening member 46 extending through opening 34 and fastening member 45 extending upwards via opening 30. In this manner support member 44 can be adjusted for the particular stake pocket 26 of a truck, as stake pockets 26 of different trucks can have opening 34 at a different height along inner wall 21b.

Platform 15 has a first portion 15a with a bottom surface which lies flush upon the upper surface 25a of top wall 21a of side 20a, and a second portion 15b perpendicular to first portion 15a which lies flush upon the inward facing surface 25b of inner wall 21b so that the platform 15 lies square along the edge 25c formed at the intersection of perpendicular surfaces 25a and 25b, as best shown in FIGS. 4 and 5. In this manner, first portion 15a lies horizontal and second portion 15b lies vertical with respect to top wall 21a and side wall 21b, respectively. A hole or opening 42 is provided in first portion 15a of platform 15 and positioned over opening 30 in wall 21a of one of stake pockets 26 which may be nearest cab 22. Fastening member 45 of support member 44 extends through opening 30 and through opening 42 of platform 15 and is then retained via a washer 56 by a retainer member of a nut 57. Fastening member 46 of support member 44 extends through opening 34 is then retained via a washer 58 by a retainer member of a nut 59. When nuts 57 and 59 are tightened with respect to their respective fastening members 45 and 46, bracket member 44a is held tight along interior surface 21d of top wall 21a, and bracket member 44b is held tight along interior surface 21e of inner wall 21b, thereby attaching platform 15 in a fixed stationary position to side 20a of bed 19 of truck 18. Fastening members 45, 46, and 51 may represents threaded rods welded or formed with support member 44 and have exterior threads along which their respective threaded nuts 57, 59, and 54 may be tightened. Alternatively, fastening members 45, 46, and 51 may represent screws with heads that are received through holes provided along support member 44. Less preferably, a single "L" shaped bracket member may provide support member 44 having fastening members 45 and 46, where bracket members 44a and 44b are in a unitary structure perpendicular to each other without the adjustment mechanism provided by fastener members 51, slots 52, washers 53, and nuts 54.

As shaft 12 extends upward from its fixed position along platform 15, it first extends vertically along a section 12a of shaft 12, then bends at an angle inwardly away from side 20a along a section 12b of shaft 12, and then vertically at a section 12c of shaft 12 at its upper end 14. This locates the upper end 14 of shaft 12 at a position behind truck cab 22 near the back top corner of the cab 22 at a height so that warning device 16 extends above the height of the roof 23 of cab 22. Such angle of the shaft at its section 12b also generally follows (or mimics) the contour or curved outer profile of the side 27 of cab 22 along which section 12a extends. For example, side 27 of cab 22 generally extends (or slopes), as indicated by a dashed line 66 of FIG. 6A, at an angle 66a with respect to the horizontal dimension of the truck along its width. The selected angle at which section 12b inwardly bends is the same (or approximately the same) as angle 66a. Preferably, the angle at which section 12b inwardly bends at least approximates the side profile of cabs of common pickup trucks, but other angle may be selected than shown. Such shape of shaft 12 may minimize the shaft 12 interference with driver view through the windows of cab 22. Less preferably, the shaft 12 is entirely vertical. The shaft 12 extends to a height so that at least a portion, if not all, of optical warning device 16, from which optical warning signals 24 project, extends higher than cab 22.

Extending downward from base 17 of warning device 16 is a downward extending portion provided by a mounting shaft 60. When upper end 14 of shaft 12 along its section 12c receives therein mounting shaft 60, a threaded bolt 61 is received through holes 62 that extend through upper end 14 of shaft 12 and holes 63 that extend through mounting shaft 60, and retained via a washer 64 by a retainer member of a nut 65. In this manner, shaft 12 is fixed stationary in attachment to warning device 16. Attachment of shaft 12 to platform 15 may take place before or after attachment of platform 15 to a side of bed 19 using support member 44 in one of the stake pockets 26.

A cable 67 (FIG. 3) has wires for supplying power to warning device 16 and controlling its operation in accordance with the particular warning device 16 manufacturer's specification. Typically these wires include ground and power lines, and one or more control lines to electronics in the warning device 16 for selecting patterns and/or rates (or color if multiple color output is available) of optical warning signals from one or more light sources (e.g., LED(s) or lamp(s)) present in warning device 16. Such optical warning signals are projected by the optical system outward (e.g., lenses and/or reflectors) of the warning device 16, such as depicted at 24 in FIG. 1. The cable 67 extends through shaft 60 of warning device 16, shaft 12 of bracket 10, and extension member 36 of platform 15 and below the platform via opening 30 of stake pocket 26 into cavity 32. Via cavity 32, cable 67 is provided of a length so that it may extend within side 20a of truck 18 in spaces or cavities in the truck body (which may already be used with existing vehicle wiring) in the manner typical of installation of warning lights in vehicles to power and enable control of operation thereof by an operator in cab 22 per the warning device 16 manufacturer's specification. While cavity 32 may be enclosed with openings 30 and 34, often cavity 32 of the stake pocket 26 is open to the rest of the interior between walls 21b and 21c of side 20a of truck 18, however if not, holes may be drilled in cavity 32 within side 20a to enable such passage of cable 67 within the body of truck 18.

Figure 6:
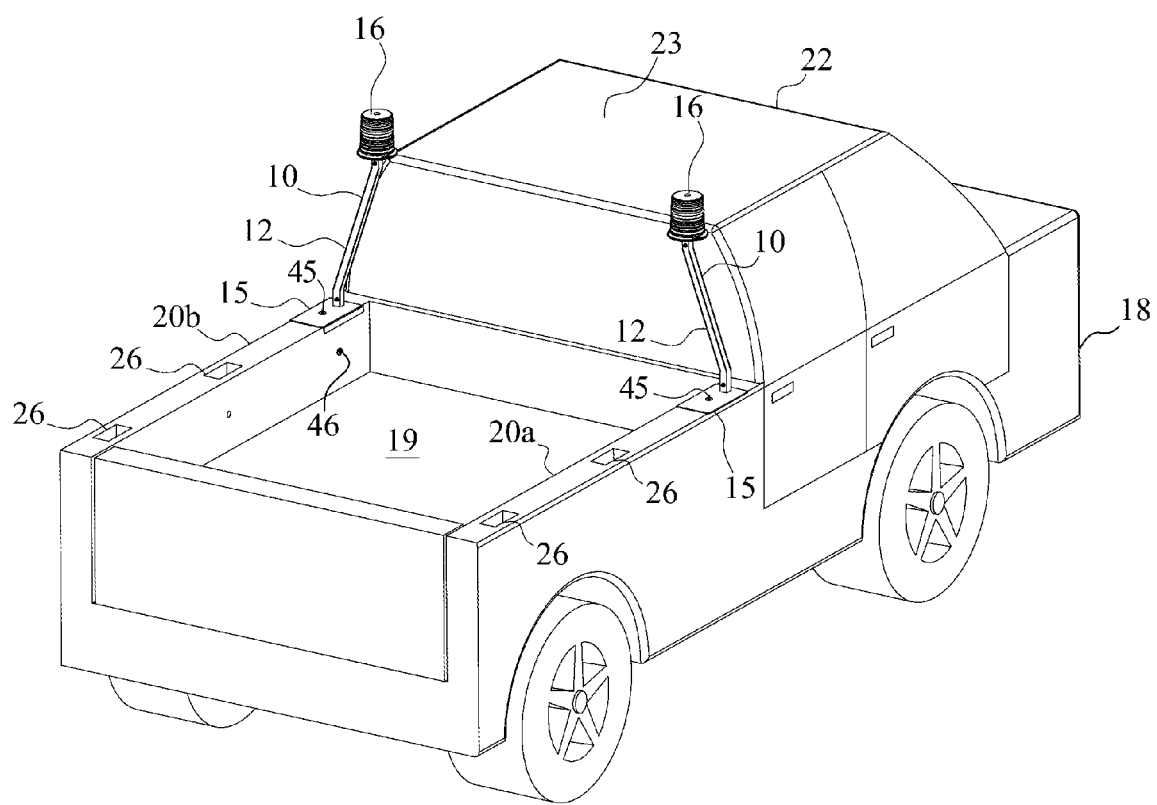
FIG. 6 is same perspective view as FIG. 1 showing for example two of the brackets of FIG. 1 mounted along different sides of the truck bed.
Figure 6A:
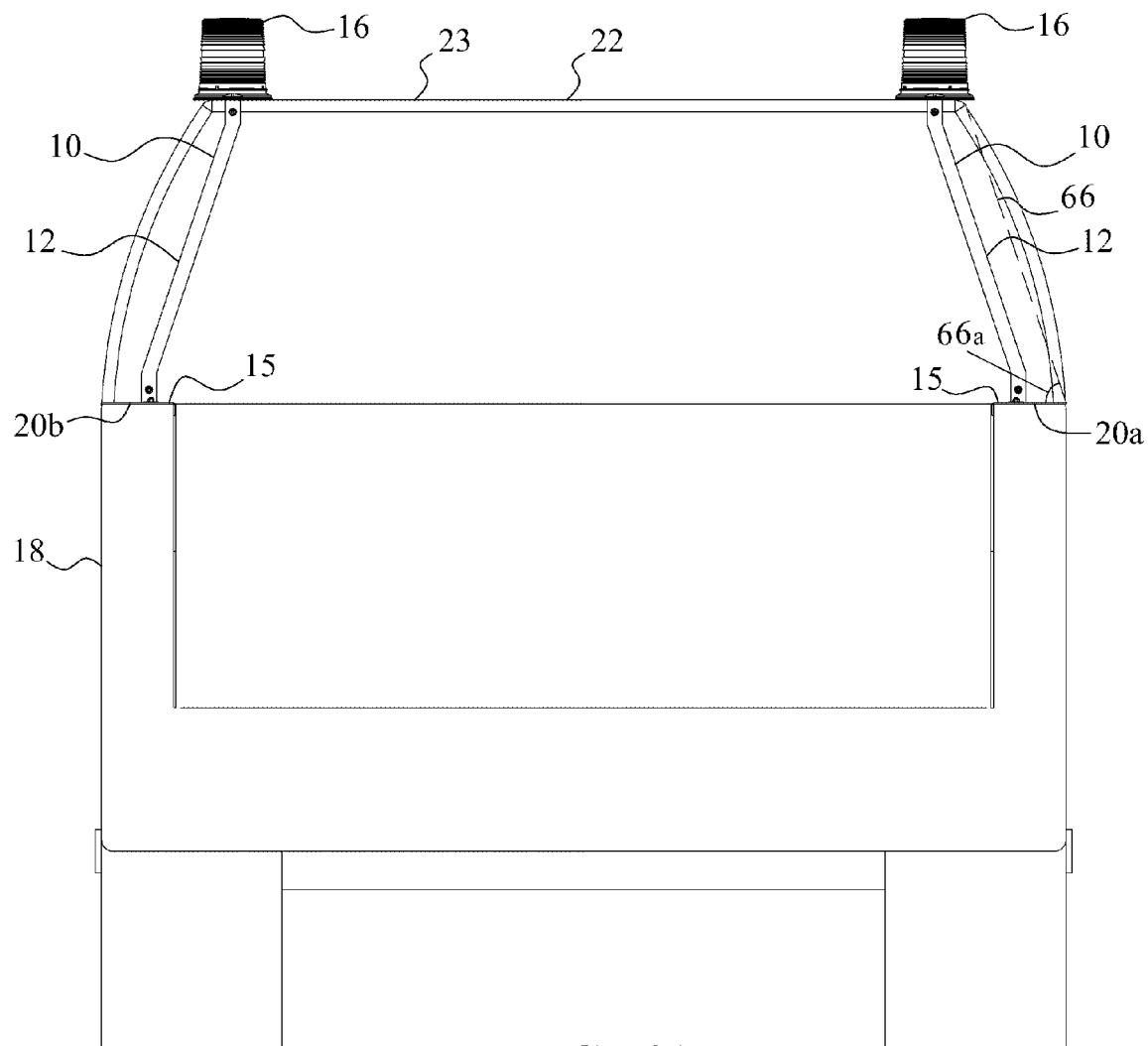
FIG. 6A is a rear view of the truck of FIG. 6 showing for example two of the brackets of FIG. 1 mounted along different sides of the truck bed.

Although a single bracket 10 may be used to mount a single warning device 16 to side 20a of truck 18 as shown in FIG. 1, a second one of bracket 10 may be mounted in the same manner as described above to the other side 20b of bed 19 of truck 18 to locate a second one of optical device 16 at a position near the left back upper corner as shown in FIGS. 6 and 6A which mirrors the first one of optical device 16 positioned near the right back upper corner of cab 22. Thus use of bracket 10 enables one warning device 16 or multiple optical warning devices 16 to be freestand mounted along sides of a truck bed as desired from stake pockets 26.

Figure 7:
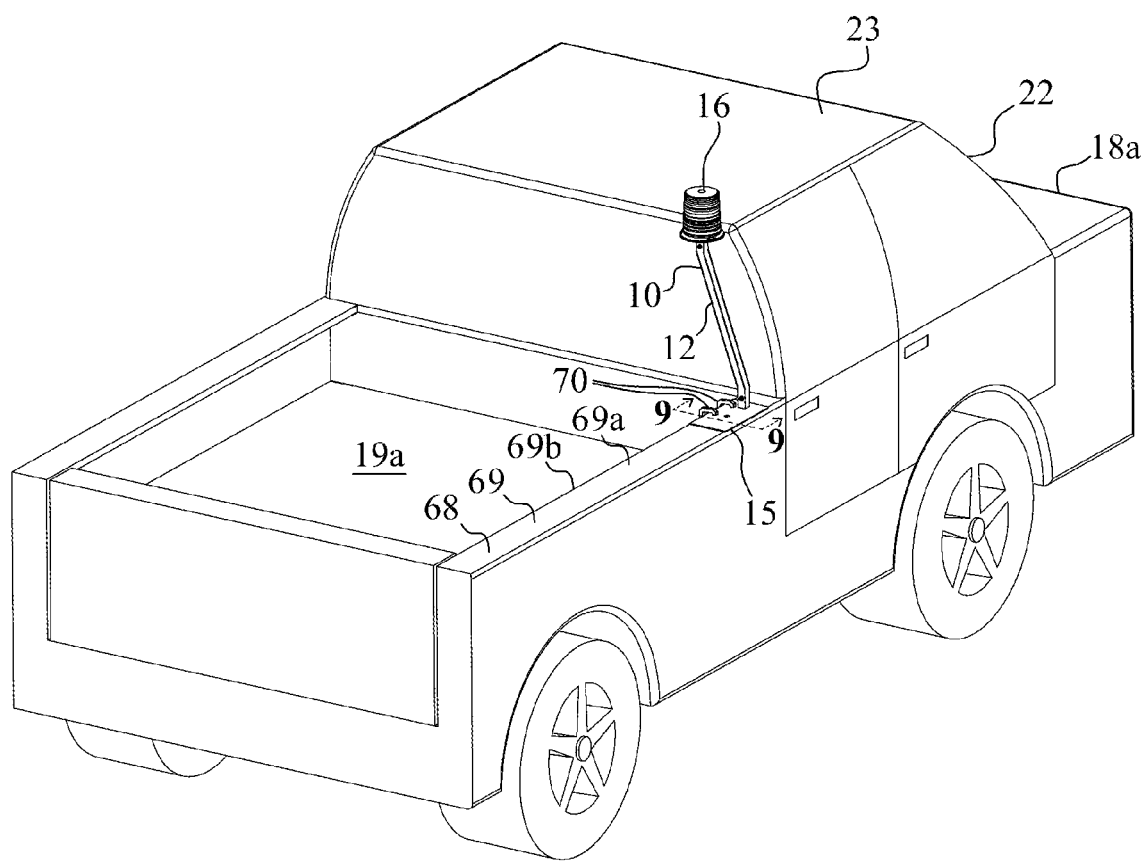
FIG. 7 is another perspective view of the rear of a pickup truck similar to FIG. 1 showing the bracket of the present invention mounted to the upper wall of one side of the bed of a truck without stake pockets.
Figure 8:
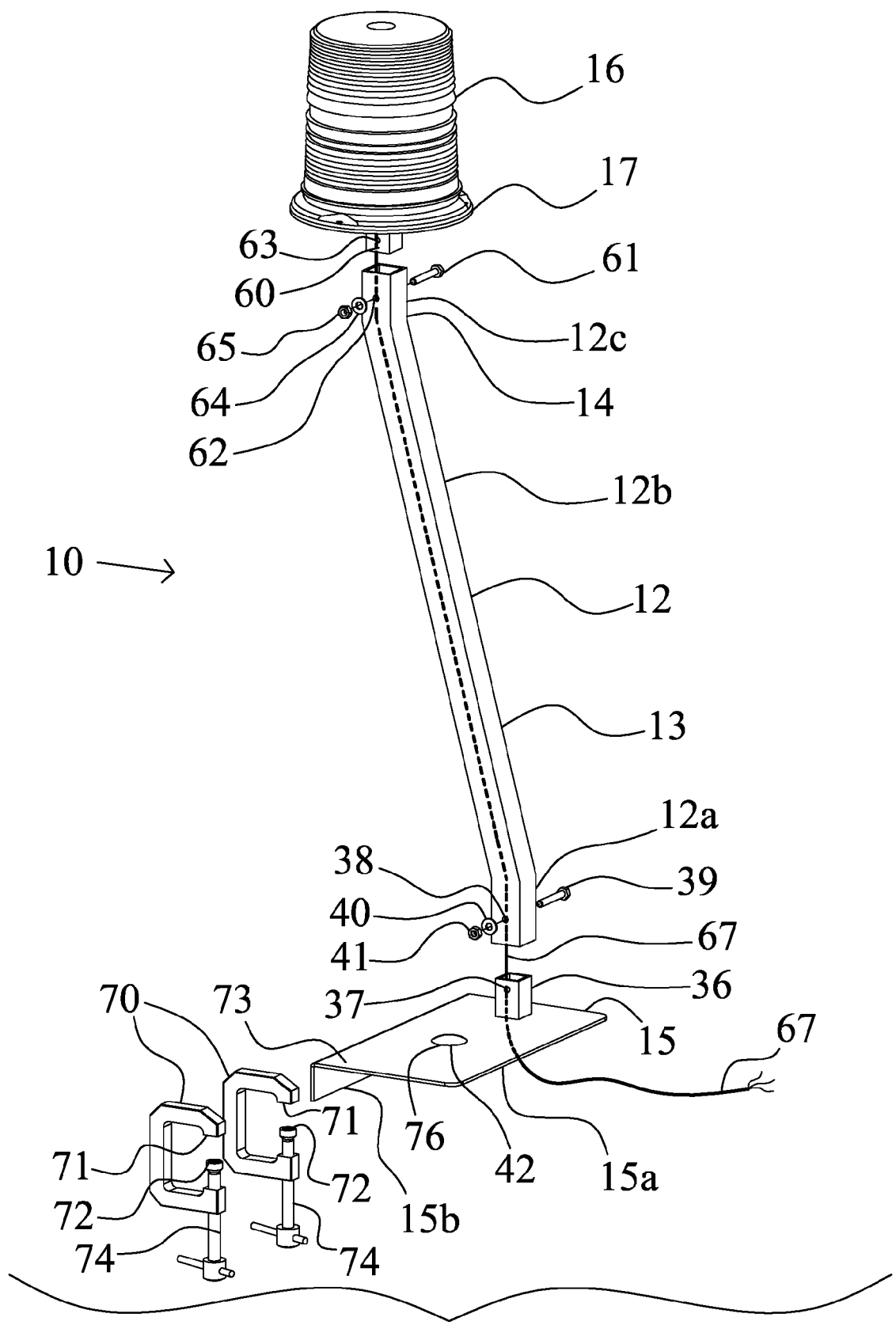
FIG. 8 is an exploded perspective view of the assembly of components for non-stake pocket mounting of bracket of FIG. 7 to a truck in which the truck is removed.
Figure 9:
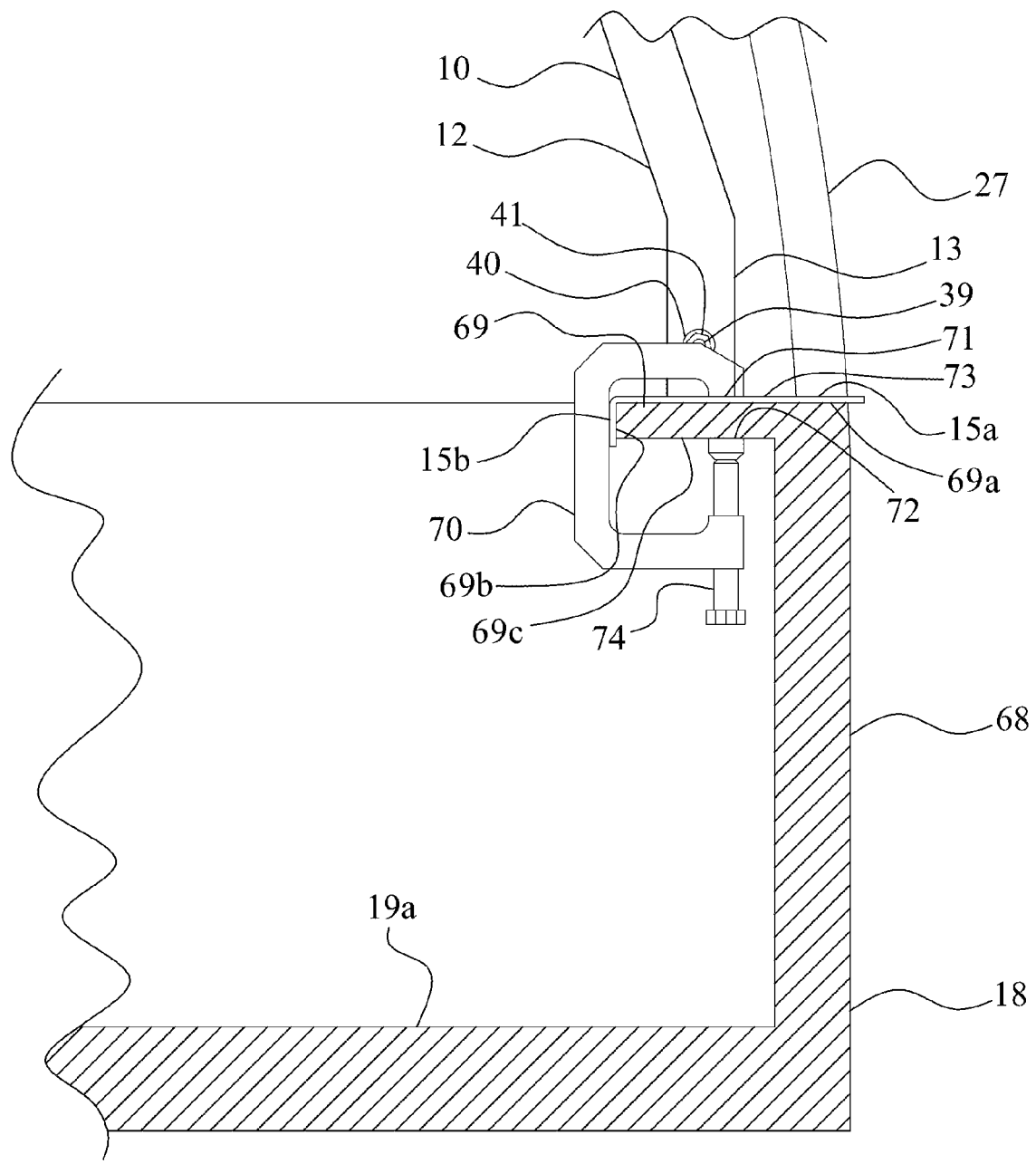
FIG. 9 is a cross-sectional view along the lines 9-9 of FIG. 7 showing of the lower part of the bracket and mounting to the side of the truck bed.

Bracket 10 may also be mounted to a truck 18a that does not have stake pockets 26 as shown in FIG. 7. In this case, truck 18a has an upper wall 69 along the side 68 of bed 19a of truck 18a. The shaft 12 and platform 15 are attached to each other the same as described above, but instead of support member 44, one or more clamp members 70 fix platform 15 stationary upon upper wall 69. As shown in FIG. 9, the first portion 15a of platform 15 lies flush upon top surface 69a of wall 69, and the second portion 15b of platform 15 lies flush upon the inwardly facing surface 69b of wall 69 so platform 15 lies over the upper inner edge of wall 69 as shown in FIG. 9. In the example shown, two clamp members 70, such as C-clamps, each having two clamping surfaces 71 and 72 disposed against upper surface 73 of platform 15 and lower surface 69c of wall 69, respectively, so that turning a turn screw 74 of the clamp positions its clamping surface 72 upwards and fixes the position of platform 15 stationary with respect to side 68 in the manner typical of a C-clamp. As hole 42 of platform 15 is not utilized, a protective cap or cover 76 may optionally be placed in hole 42. Other types of clamp members 70, than C-clamps, may also be used to fix or attach platform 15 to side 68 of truck 18a. Further, although two clamp members 70 are shown, a single clamp may be used in clamping having surfaces 71 and 72 with surface areas which can fix platform 15 stationary with respect to side 68. Thus use of bracket 10 enables warning device 16 to be freestand mounted to side 68 of truck bed 19a as desired when stake pockets 26 are not present. Attachment of shaft 12 to platform 15 may take place before or after clamping of platform 15 to the side of the bed of the truck. Multiple warning devices 16 may be similarly mounted, such as another one along the opposite side of side 68 of bed 19a of truck 18a so that they mirror each other similar to that shown in FIGS. 6 and 6A.

The bracket 10 of the present invention may be easily removed by releasing fastening member 45 from its nut 57 (or releasing clamp members 70), so that shaft 12 and platform 15 can be together removed the side of the truck bed along with cable 67. When stake pocket 26 is used from mounting, support member 44 may be removed by releasing fastening member 46 from its nut 59, or such support member 44 may be retained in stake pocket 26 if later remounting of platform 15 with bracket 10 is desired. Accordingly, the body of the truck 18 or 18a is thus undamaged by the mounting of warning device 16 using bracket 10 as exterior drilled holes in the body of the truck 18 or 18a were not needed to enable mounting of the warning device.

Although shaft 12 and platform 15 are shown and described above as separate components which are integrated with each other, shaft 12 and platform 15 may instead be a single unitary structure or unit (such as of molded plastic, or welded metal components) of bracket 10 without the attaching mechanism provided by member 36, bolt 39, washer 40, nut 41, and holes 37 and 38. In this case, bracket 10 is the same as shown in FIGS. 1, 2, 6, and 7, but without such attaching mechanism. For example, prior to platform 15 being disposed upon the side of bed 19 of a truck, the shaft 12 and platform 15 may represent a unitary structure, or optionally integrated with each other by such attaching mechanism. Further, although the base 17 of optical warning device 16 is shown and described above as being attached to shaft 12, the base 17 of optical warning device 16 may also be part of the unitary structure or unit with shaft 12 or with both shaft 12 and platform 15, thus without need for mounting shaft 60 and associated elements 61-65 for attachment thereto.

From the foregoing description it will be apparent that there has been provided a bracket for freestand mounting an optical warning device to the side of a truck bed. Variations and modifications in the herein described bracket, and systems and methods for installing same, will undoubtedly suggest themselves to those skilled in the art. Accordingly the foregoing description should be taken as illustrative and not in a limiting sense.

The invention claimed is:

1. A bracket for mounting an optical warning device to a side of a bed of a truck having a cab, said bracket comprising:
   a shaft having an upper end for mounting an optical warning device, and a lower end; and
   a platform supporting said lower end of said shaft, and said platform being fixable to a side of a bed of a truck, in which said upper end of said shaft extends from said shaft to position at least a portion of said optical warning device at a height higher than a cab of said truck, wherein at least a portion of said platform has a bottom surface locatable upon a top external surface of said side of the bed of the truck.

2. The bracket according to claim 1 wherein said shaft extends from said platform to freestand mount said optical warning device from said side of the bed of the truck.

3. The bracket according to claim 1 wherein said optical warning device projects optical warning signals viewable from a front, back, right side, and left side of the truck.

4. The bracket according to claim 1 wherein at least a portion of said shaft bends to least approximately follow an angled or curved outer profile of one of a left or right side of the cab as the shaft extends upward from the platform.

5. The bracket according to claim 1 further comprising a support member receivable in a stake pocket of said side of the bed of the truck via an opening to the stake pocket along said top external surface, in which said support member is attached to said platform to retain said platform in a fixed position to said side of the bed of the truck.

6. The bracket according to claim 5 wherein said support member comprises a fastener member for attaching said support member to an inner wall of the side of the bed via an opening of the stake pocket along said inner wall.

7. The bracket according to claim 1 further comprising one or more clamping members for clamping said platform in a fixed position to said side of the bed of the truck.

8. The bracket according to claim 1 wherein said shaft and said platform are one of integrated or in a unitary structure with each other prior to said platform being disposed upon the side of the bed of the truck.

9. The bracket according to claim 1 wherein said platform comprises a hole locatable over a first opening in said external top surface of said side of the bed of the truck that extends to a cavity within said side of the bed of the truck, and said bracket further comprises a support member in the cavity having an upper fastening member extending through said first opening and said hole of said platform for capture by a first retaining member, and a lower fastening member extending through a second opening to said cavity via an inwardly facing external surface of said side of the bed of the truck for capture by a second retaining member.

10. The bracket according to claim 9 wherein said support member comprises two bracket members fixed to an adjusted position with respect to each other so said upper fastening member is positioned to extend through said first opening and said lower fastening member is positioned to extend through said second opening.

11. The bracket according to claim 9 wherein said first opening, said second opening, and said cavity are provided by a stake pocket of the truck.

12. The bracket according to claim 9 wherein said portion of said platform represents a first portion of said platform, and said bottom surface of said first portion is locatable flush upon said top external surface of said side of said bed of the truck, and said platform has a second portion perpendicular to said first portion locatable along said inwardly facing external surface.

13. The bracket according to claim 1 wherein said shaft is part of a unitary structure with one or more of said platform and said optical warning device.

14. The bracket according to claim 1 wherein said upper end of said shaft is coupled to a base of the optical warning device.

15. The bracket according to claim 1 wherein the side of the bed of the truck represents one of a left or right side of the bed, and another of said bracket is separately mountable to a different one of the left or right side of the bed of the truck.

16. A system for mounting an optical warning device to a truck, said system comprising:
an optical warning device; and
a bracket having an upper end mounted to said optical warning device, and a lower end configured to couple to one of a right or left side of a bed of a truck, in which said bracket extends upward away from said side of said bed to freestand mount the optical warning device from said side of the bed of the truck, wherein said bracket comprises a platform at said lower end which is fixable to said side of said bed of the truck so that at least a portion of said platform has a bottom surface which extends along a top external surface of said side of the bed of the truck.

17. The system according to claim 16 wherein said portion of said platform extends horizontally along said top external surface when fixed to the side of the bed of the truck.

18. The system according to claim 16 wherein said optical warning device projects optical warning signals circumferentially around the truck viewable from a front, back, right side, and left side of the truck.

19. The system according to claim 16 wherein said bracket comprises a shaft extending from said platform.

20. The system according to claim 19 wherein at least a portion of said shaft bends inwardly at an angle selected in accordance with a slope of an outer profile of one of a left or right side of a cab of the truck along which said portion of said shaft extends.

21. The system according to claim 19 wherein said shaft bends along at least a portion thereof to configure said shaft to at least approximately follow an angled or curved outer profile of one of a left or right side of a cab of the truck along which said shaft extends.

22. The system according to claim 16 wherein said lower end of said bracket is coupled to a support member mountable in a stake pocket present along said side of the bed of the truck.

23. The system according to claim 16 wherein said bracket is fixed by one or more clamp members to said side of the bed of the truck.

24. The bracket according to claim 1 further comprising a support member receivable in a stake pocket of said side of the bed of the truck via an opening to said stake pocket in said top external surface of said side of the bed of the truck, said support member being in attachment to said portion of said platform, and said bottom surface of said portion of said platform extends from said attachment along said top external surface of said side of the bed of the truck.

25. The bracket according to claim 1 wherein said portion of said platform represents a horizontally disposed first portion along said top external surface of said side of the bed of the truck, and said platform has a vertical second portion that lies along a side of the bed of the truck perpendicular to said top external surface.

26. A bracket for mounting an optical warning device to a side of a bed of a truck having a cab, said bracket comprising:
a shaft having an upper end for mounting an optical warning device, and a lower end; and
a base supporting said lower end of said shaft, and said base being fixable to a side of a bed of a truck, in which said upper end of said shaft extends from said shaft to position at least a portion of said optical warning device at a height higher than a cab of said truck, wherein at least a portion of said shaft bends to at least approximately follow an angled or curved outer profile of one of a left or right side of the cab along which said portion extends.

27. The bracket according to claim 26 wherein said shaft extends from said lower end vertically upwards to said portion of said shaft, and then after said portion extends vertically upwards to said upper end for mounting said optical warning device.

28. A system for mounting an optical warning device to a truck, said system comprising:
an optical warning device having wires for at least supplying power for enabling operation of one more light sources of the optical warning device; and
a bracket having an upper end mounted to said optical warning device, and a lower end coupled to a support member mountable in a stake pocket present along a side of a bed of a truck, in which said bracket comprises a shaft that extends upward away from said side of said bed of the truck to freestand mount the optical warning device from said side of said bed of the truck, and said wires extend from said optical warning device through said shaft via said stake pocket into a body of the truck along said side of said bed of the truck.

* * * * *